April 28, 1964   J. F. HEALY   3,131,012
SAFETY LOCKING ELECTRICAL CABLE CONNECTOR BODY AND CAP
Filed Feb. 7, 1961   5 Sheets-Sheet 1

INVENTOR
Joseph F. Healy
BY
Wooster, Davis & Cifelli
ATTORNEYS

April 28, 1964  J. F. HEALY  3,131,012
SAFETY LOCKING ELECTRICAL CABLE CONNECTOR BODY AND CAP
Filed Feb. 7, 1961  5 Sheets-Sheet 2

INVENTOR
Joseph F. Healy
BY
Wooster, Davis & Cifelli
ATTORNEYS

April 28, 1964   J. F. HEALY   3,131,012
SAFETY LOCKING ELECTRICAL CABLE CONNECTOR BODY AND CAP
Filed Feb. 7, 1961   5 Sheets-Sheet 3
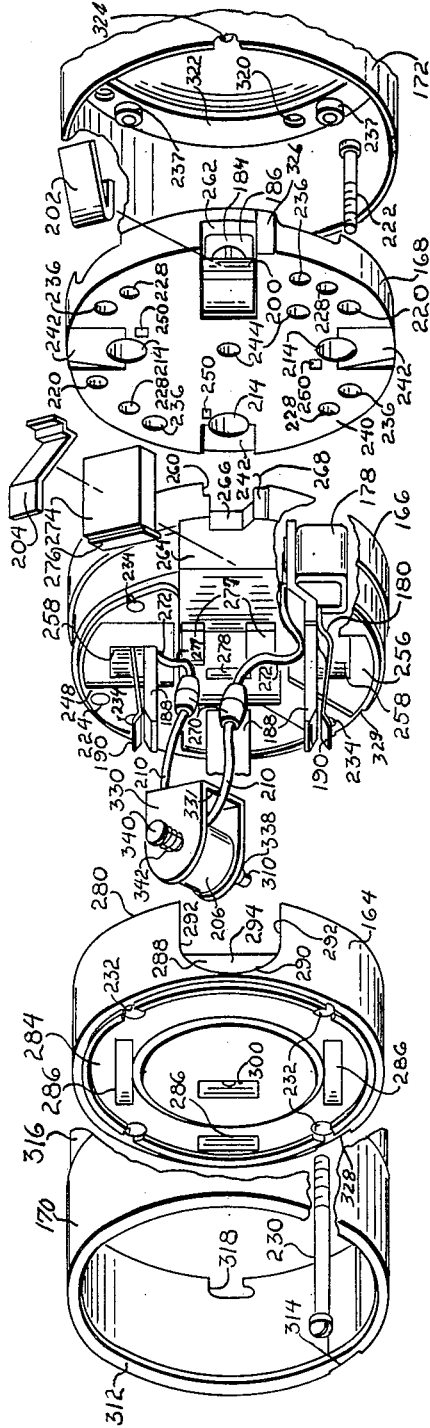
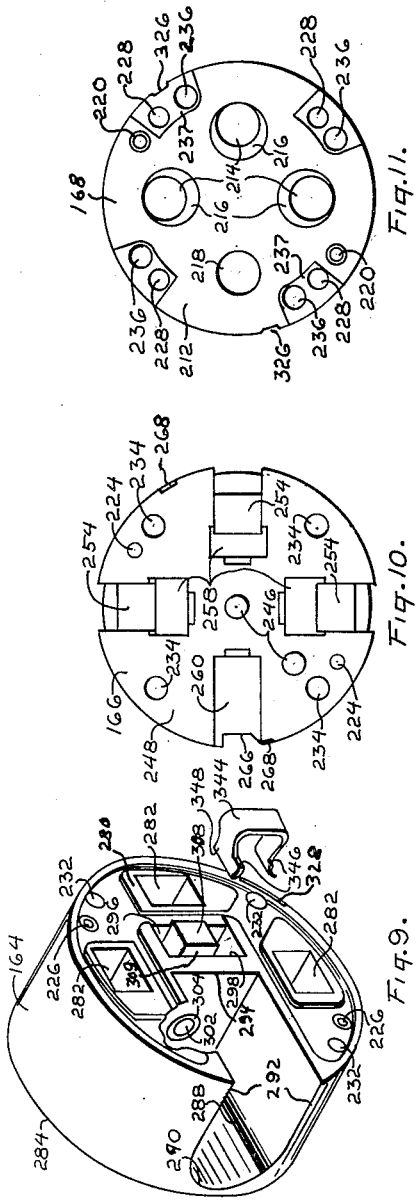
INVENTOR
Joseph F. Healy
BY
Wooster, Davis & Cifelli
ATTORNEYS April 28, 1964  J. F. HEALY  3,131,012
SAFETY LOCKING ELECTRICAL CABLE CONNECTOR BODY AND CAP
Filed Feb. 7, 1961  5 Sheets-Sheet 4

INVENTOR
Joseph F. Healy
BY
Worster, Davis & Cifelli
ATTORNEYS

April 28, 1964
J. F. HEALY
3,131,012
SAFETY LOCKING ELECTRICAL CABLE CONNECTOR BODY AND CAP
Filed Feb. 7, 1961
5 Sheets-Sheet 5
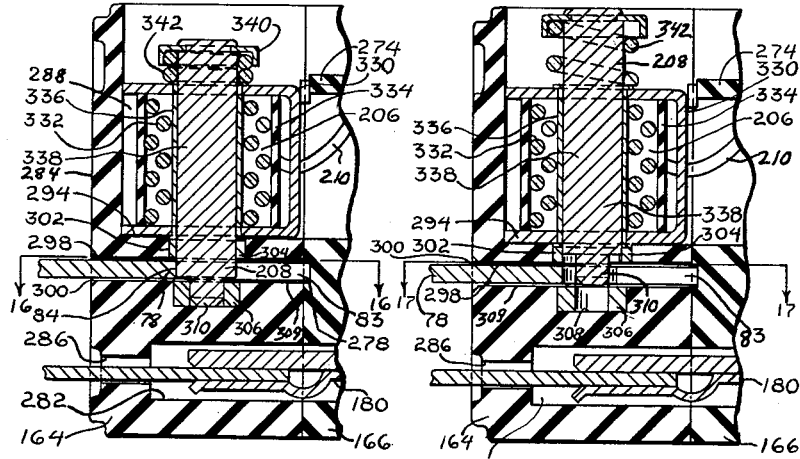
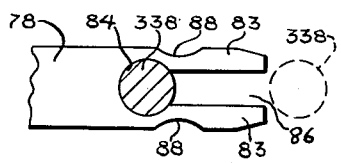
Fig.16.
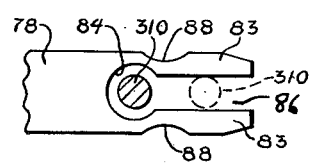
Fig.17.
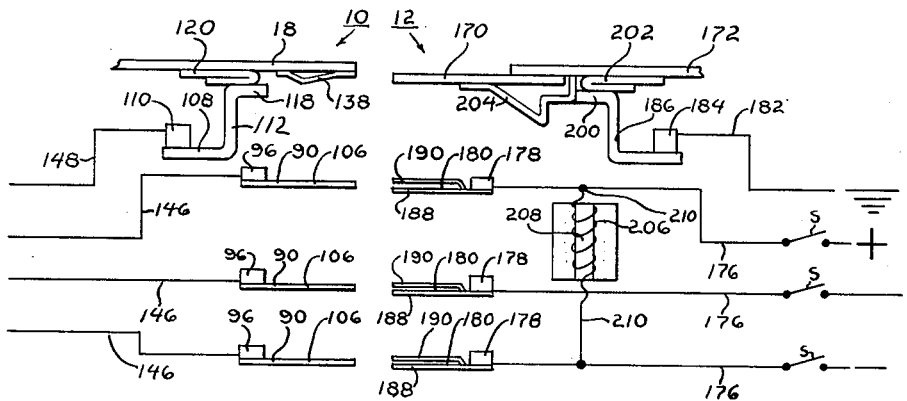
Fig.18.
INVENTOR
Joseph F. Healy
BY
Wooster, Davis + Cifelli
ATTORNEYS

United States Patent Office

3,131,012
Patented Apr. 28, 1964

3,131,012
SAFETY LOCKING ELECTRICAL CABLE
CONNECTOR BODY AND CAP
Joseph F. Healy, Westport, Conn., assignor to Harvey Hubbell, Incorporated, Bridgeport, Conn., a corporation of Connecticut
Filed Feb. 7, 1961, Ser. No. 87,562
6 Claims. (Cl. 339—12)

This invention relates to electrical wiring apparatus, and particularly to detachable electrical couplings for electrical power cable, such as electrical connectors for electrical cable comprising a detachable connector cap and connector body, and more particularly to such electrical connectors for such cables that are of the heavy duty type, for example, those which operate at voltages of 440 to 600 volts, and carry currents in excess of 50 amperes.

It is generally recognized in the electrical wiring apparatus art that when dealing with high-capacity electrical conditions of voltage and current, safety becomes a predominant problem and a serious concern. For example, in the usage of electrical connectors wherein high currents and voltages are involved, it is known in the art that if electrical connection is made or broken at a time when the supply of electrical power is operative on the cable, i.e. the cable section connected to one of the connector components is connected to the electrical supply, dangerous arcing is likely to occur. It is imperative to safe operation that the supply of electrical power be broken at the source before either connecting or disconnecting the electrical connector. In recognition of this safety hazard, it is a present requirement of the Underwriters' Laboratories, the generally recognized, safety standard setting agency for electrical devices in the United States of America, that a prominent warning label be placed on all detachable electrical connectors wherein currents of 60 amperes or larger are involved, stating that the electrical connector should not be connected or disconnected prior to de-energization of the cable by breaking the electrical power supply at the source. Notwithstanding the desirability of employing such a warning label on prior art electrical connectors, it will be readily recognized that such warnings are susceptible of being overlooked or ignored by workmen and therefore, that a safety problem still exists in spite of their use.

It is a principal object of this invention to provide an improved electrical connector which automatically eliminates the safety hazard discussed in the preceding paragraph, and thereby erases a serious problem in the electrical wiring apparatus art.

It is another object of the invention to provide an improved electrical connector as set forth in the preceding paragraph which is constructed in a manner which lends itself to economical and feasible production techniques.

The principal object of the invention is achieved in one form by providing a detachable electrical connector having a positive locking arrangement, partially formed on each of the two usual connector components, the locking portion thereof that is formed on the connector component which is attached to the cable section that, in turn, is electrically connected to the electrical power supply, including an electrically operated latching member that cooperates with a latching member on the other connector component and positively automatically prevents connection of the connector components when they are disconnected if the electrical power supply is electrically connected to said cable section, and which positively automatically prevents disconnection of the connector components if they are connected and the electrical power supply is electrically connected to said cable section. Therefore, the principal object of the invention is accomplished, for it is a prerequisite to either connection or disconnection of the connector components that the electrical power supply be broken at the source, and it is impossible to connect or disconnect the connector components if the electrical power supply is not broken at the source.

Other objects and further details of that which I believe to be novel and my invention will be clear from the following description and claims taken with the accompanying drawings, wherein:

FIG. 8 is an exploded view of the connector body;

FIG. 9 is a perspective view of one body section of the connector body, showing the side thereof opposite to the one shown in FIG. 8;

FIG. 10 is an elevational view of another body section of the connector body, showing the side thereof opposite to the one shown in FIG. 8;

FIG. 11 is an elevational view of the other body section of the connector body, showing the side thereof opposite to the one shown in FIG. 8;

FIG. 14 is an enlarged view of a portion of FIG. 1 showing the latching construction with the solenoid pin in projecting, latching position;

FIG. 15 is a view similar to FIG. 14, but showing the solenoid pin in retracted, unlatching position;

FIG. 16 is a sectional view taken substantially on line 16—16 of FIG. 14;

FIG. 17 is a sectional view taken substantially on line 17—17 of FIG. 15, and

FIG. 18 is a schematic wiring diagram of the illustrated connector cap and body.

Figure 1:
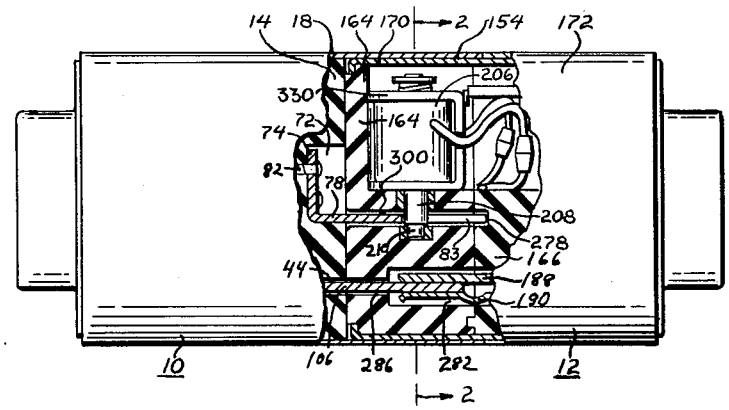
FIG. 1 is a side elevational view of a safety locking electrical cable connector body and cap embodying my invention, shown in connected, locked condition with portions broken away and shown in section for clarity.

In the drawings there is illustrated one embodiment of my invention which has been found in practice to completely satisfy the object of the invention. The illustrated embodiment comprises an electrical cable connector, and it will be described in detail; however, if desired, the invention may be incorporated in other electrical wiring apparatus, such as, electrical attachment plugs and receptacles. The illustrated embodiment is intended to be used in high capacity, electrical power, practical applications wherein it might be used, for example, as part of the electrical power supply wiring system for portable electric cranes, heavy welding equipment and electric furnaces, which are used in steel mills, mining operations, petroleum refineries, and other heavy industries. The illustrated embodiment, however, may be applied in practical applications where smaller electrical power capacities are involved, and in many other industrial applications. For the purpose solely of exemplification, the illustrated embodiment may be conveniently manufactured so as to operate at 440 volts and 100 amps. In the illustrated embodiment, a four-wire cable is illustrated and will be described as being connected to the improved, locking, electrical cable connector, and in such arrangement three of the wires are utilized variously to achieve either 440 volt or 220 volt operation, as is known in three-wire electrical transmission. One of these three wires is a grounded-neutral wire and can be utilized with either of the other two wires to achieve 220 volt operation. The other two wires are the main lines and are utilized to achieve 440 volt operation. The fourth wire is utilized as an equipment ground, and, as will become apparent, operates to ground the casing of the connector as well as portions of the electrically operated device being powered through the connector.

Figure 4:
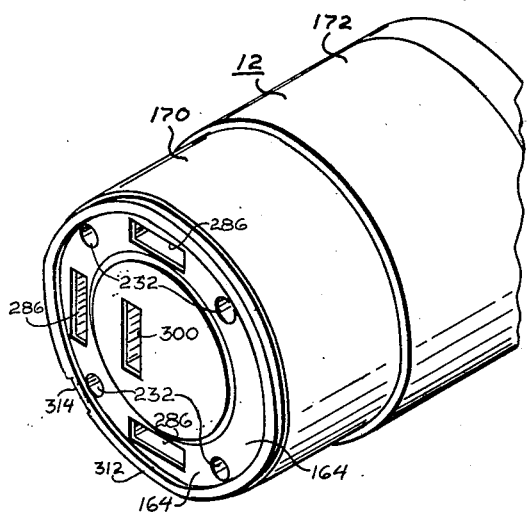
FIG. 4 is a perspective view of the front end of the connector body.
Figure 5:
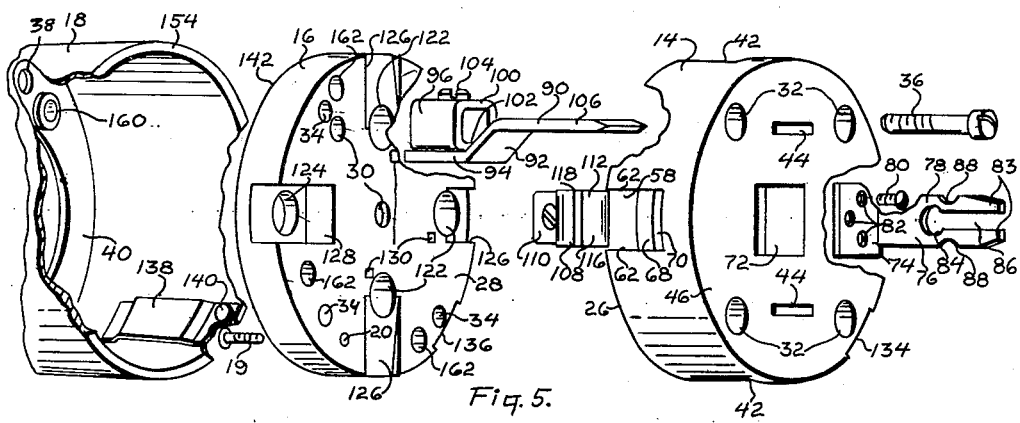
FIG. 5 is an exploded view of the connector cap.
Figure 6:
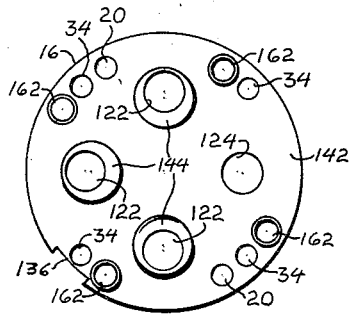
FIG. 6 is an elevational view of one body section of the connector cap, showing the side thereof opposite the one shown in FIG. 5.
Figure 7:
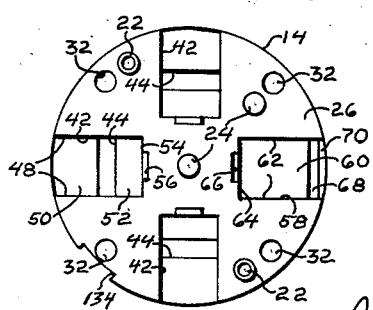
FIG. 7 is an elevational view of the other body section of the connector cap, showing the side thereof opposite the one shown in FIG. 5.

The illustrated embodiment of the invention comprises an electrical cable connector having two major components, namely, the connector cap 10 and the connector body 12, each of which has a section of multiwire cable wired to it, and which are selectively connectible to and disconnectible from each other to connect or disconnect the cable sections. These connector components are illustrated in their connected condition in FIGS. 1 and 2 and in their disconnected condition in FIGS. 12 and 13. In both of these illustrated conditions, the parts of the connector are displayed in the positions they take when the connector body is electrically connected to a source of electrical power. As will become clear subsequently, in the connected FIGS. 1 and 2 condition the connector cannot be disconnected, and in the disconnected FIGS. 12 and 13 condition the connector cannot be connected until the supply of electrical power is broken at the source. The connector cap 10 is illustrated by itself in FIG. 3 and an exploded view of it is illustrated in FIG. 5. The connector body is illustrated by itself in FIG. 4 and an exploded view of it is illustrated in FIG. 8. A representative schematic wiring diagram showing the circuitry of the illustrated embodiment of the invention is illustrated in FIG. 18.

*Connector Cap*

The construction and assembly of connector cap 10 can best be understood by reference to FIGS. 3 and 5–7. The connector cap 10 comprises essentially two body sections 14 and 16 that are assembled together, support a number of other elements to be described, and are mounted as an assembly in a metallic casing 18. The connector cap body sections 14 and 16 are generally configured as diametral sections of a cylinder, are made of an electrical insulating material and are configured and arranged to snugly nest and be secured together by a pair of screws 19 that extend through a pair of bores 20 formed in the body section 16 and are anchored in a pair of threaded inserts 22 that are embedded in body section 14. A pair of spaced circular axial projections 24 is formed on the axial side 26 of the body section 14 that is contiguous with the axial side 28 of the body section 16 when the body sections are assembed, and a cooperating pair of spaced circular axial recesses 30 is formed in the body section 16 that open to the axial side 28 thereof. The projections 24 are positionable in recesses 30 and cooperate to permit assembly of the body sections 14 and 16 in only one predetermined desired manner. When the body sections 14 and 16 are fully assembled, they are disposed and mounted as an assembly in the generally cylindrical casing 18 so as to be fully housed therein. To mount the assembled body sections 14 and 16 in the casing 18, the body sections 14 and 16 have a plurality of aligned bores 32, 34, respectively, which are arranged to receive screws 36 that are anchored in threaded openings 38 formed in a radial wall portion 40 of the casing 18 which is formed at one axial end thereof.

In addition to the construction described thus far, the body section 14 (see FIG. 7) also includes four, circumferentially spaced, irregularly formed notches which open circumferentially thereof and to the axial side 26 thereof. Three of these notches, which are designated by reference numeral 42, are similarly shaped and communicate with rectangular slots 44 that extend completely through the body section 14 and open to the other axial side 46 thereof. Each notch 42 extends from the axial side 26 toward, but short of, the axial side 46 of the body section 14, and includes a pair of parallel side walls 48, a flat radial bottom wall portion 50, an inclined bottom wall portion 52 and a flat back wall 54 having a clearance space 56 formed therein. The fourth notch 58 is substantially shallower in depth than the notches 42 and does not communicate with the axial side 46 of the body section 14. Notch 58 comprises a flat radial bottom wall 60, a pair of flat parallel side walls 62, and a flat back wall 64 having a clearance space 66 formed therein. Bottom wall 60 at its peripheral portion has a stepped formation formed by cut-away portions 68 and 70.

On the axial side 46 of body section 14 there is formed a shallow central rectangular recess 72 which receives the flat mounting leg 74 of an L-shaped latching member 76 which further includes a flat elongated latching blade 78. The mounting of the latching member is effected by a plurality of mounting screws 80 that extend through openings 82 formed in the mounting leg 74 and are anchored in threaded openings formed in the body section 14 that are accessible through the recess 72. Latching blade 78 at its free end is bifurcated to form a pair of spaced fingers 83 and it includes a circular opening 84 that is disposed inwardly of the free end thereof and an elongated opening 86 that extends from the opening 84 to and through the free end of the latching blade. A pair of spaced oppositely extending arcuate cut-out portions 88 are formed in the latching blade 78 laterally thereof. When fully mounted on the body section 14, the latching blade projects from the axial side 46 of the body section 14, as can be clearly seen in FIGS. 1, 3, 12 and 13.

The body section 14 supports three male power transmitting contact-terminal assemblies 90, the terminal portion of each being respectively received in a notch 42 and the contact portion of each extending through a slot 44, through and to project beyond the axial side 46 of the body section 14. Each assembly 90 comprises a bent flat elongated metallic plate 92 which at one end 94 has rigidly secured thereto the terminal portion in the form of a box-like rectangular terminal block 96, as by being eyeletted thereto by eyelet 98 (see FIG. 13). In each terminal block, the wall 100 opposite and spaced from the wall 102 has a threaded opening formed therein and receives a threaded plug 104 that is adjustably mounted therein so as to be movable toward or away from wall 102. The terminal blocks 96 are so constructed that a bared electrical wire may be selectively clamped between terminal block wall 102 and the inner end of plug 104. Each of the plates 92 includes a contact portion in the form of a flat contact blade 106. The construction of the assemblies 90 and the body section 14 is such that the assemblies 90 are readily mounted in the body section 14 by individually sliding the contact blades 106 into the notches 42 and through the slots 44, and having the terminal blocks 96 received and disposed in the notches 42. When the assemblies 90 are so mounted, the threaded plugs are accessible through the periphery of the body section 14 to facilitate wiring, and contact blades 106 project through the slots 44 and axially away from the axial side 46 thereof, as can best be seen in FIGS. 3, 12 and 13.

A grounding contact-terminal assembly 108 is mounted in the notch 58. Assembly 108 includes a terminal portion in the form of terminal block 110 that is generally similar to the terminal blocks 96 of assemblies 90, but it differs therefrom in that it includes a bent plate 112 which differs in configuration from the bent plates 92 of assemblies 90, as can best be seen by comparing these elements in FIG. 12. The bent plate 112 of assembly 108 includes a flat mounting leg 114, a central leg 116 that extends generally at right angles thereto, and a reversely bent leg 118 that is generally parallel to the mounting leg 114, but extends in an opposite direction. The leg 118 rigidly supports a resilient U-shaped grounding contact plate 120 which is bent and arranged to make firm contact with the inner surface of the casing 18 when the connector cap is fully assembled to thereby place the casing 18 into electrical communication with the assembly 108 to ground the casing, as will become apparent subsequently.

After the assemblies 90 and 108 have been properly assembled and positioned in the notches 42 and 58, respectively, in body section 14, the body section 16 is properly oriented relative to and secured to the body section 14 by disposing the projections 24 in the recesses 30 and the utilization of the previously referred-to screws 19. The axial face 28 of the body section 16, as can best be seen in FIG. 5, is formed so as to cooperate with the body section 14 to properly mount the assemblies 90 and 108 in the connector cap and to permit the proper electrical wiring of these assemblies. For this purpose, a plurality of circular openings, three of which are designated by reference numerals 122 and the fourth of which is designated by reference numeral 124, are formed in and extend completely axially through the body section 16. On the axial side 28 of the body section 16, an arcuate portion of the openings 122 communicates with cut-away shallow inclined notches 126, whereas the entire opening 124 communicates with a deep rectangular notch 128. The axial side 28 of the body section 16 also includes three small boxy recesses 130 which are arranged to receive projecting lugs 132 formed at ends 94 of bent plates 92 of assemblies 90 (see FIGS. 12 and 13), which aid in the proper positioning of these assemblies.

When the body sections 14 and 16 are fully assembled, the assemblies 90 and 108 are properly positioned in chambers formed therein by the notches 42 which individually cooperate with the notches 126 to accommodate the terminal portions of the assemblies 90, and notch 58 which cooperates with notch 128 to accommodate the assembly 108.

On the axial side 142 of the body section 16 the openings 122 have enlarged entrances 144 that are directed radially inwardly and which facilitate the insertion of separate power carrying conductor wires 146 (see FIGS. 12 and 13), which individually pass through these entrances and openings into the chambers formed by notches 42 and 126 and are individually received in terminal blocks 96 where they are clamped rigidly by the plugs 104. A fourth wire 148 (see FIG. 12) is inserted through the opening 124 and into the chamber formed by notches 58 and 128 where it is received and rigidly clamped in the terminal block 110. As can best be seen in FIGS. 12 and 13, the four conductor wires 146 and 148 form part of the sheathed multi-wire electrical cable 150, a portion of which is disposed in a cable-gripping, strain-relieving mechanism 152, and the individual wires of which are jointly led through a central opening in the radial wall portion 40 of casing 18 in the vicinity of the axial side 142 of the body section 16, and thereafter individually led through openings 122 and 124 to their respective terminal blocks. The detailed construction of the mechanism 152 is not set forth herein for it forms no specific part of this invention, being fully disclosed and claimed in my copending application for patent for Electrical Cable Connector Having an Improved Cable Grip, filed in the United States Patent Office November 3, 1960, Serial No. 67,111.

Figure 3:
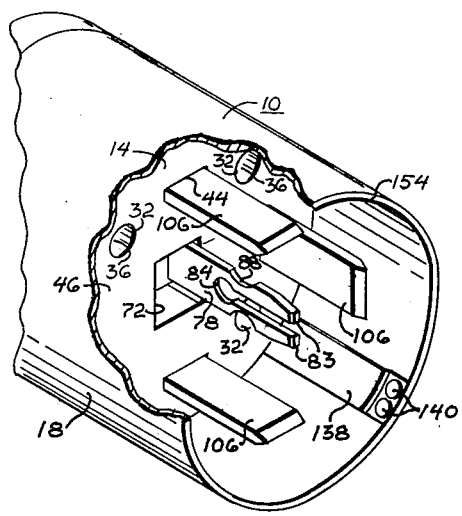
FIG. 3 is a perspective view of the front end of the connector cap with portions broken away for clarity.

Body section 14 at one peripheral portion has an axially extending groove 134 formed that aligns with a similar groove 136 formed on body section 16, and which cooperate to allow the assembled body sections 14 and 16 to be inserted as a unit through the open end of the casing 18 and to clear an elongated resilient metallic grounding contact strip 138 that is secured to the casing 18 within and near the open end thereof by the rivets 140 (see FIGS. 3 and 5). After the body sections 14 and 16 are fully assembled and inserted as a unit into the casing 18, they are rigidly secured therein and thereto by the previously referred-to screws 36.

The foregoing constitutes a detailed description of the construction and assembly of the connector cap 10. It will be understood by those skilled in the art that when the connector cap is fully assembled and cable 150 is wired to it, the free end of cable 150 (the end thereof opposite to the end that is electrically connected to connector cap 10) is appropriately electrically wired to an electrically powered device, which may be of the heavy duty type. When fully assembled, as can best be seen in FIG. 3, the connector cap 10 includes the following elements which are accessible from the exterior thereof at its front end: three axially projecting male electrical contact blades 106, each one of which is individually internally electrically connected to an electrical conducting wire 146 of cable 150; the electrically isolated centrally disposed axially projecting latching blade 78, and the resilient ground conductor strip 138 which is disposed within the annular projecting skirt portion 154 of the casing 18 at the front thereof that surrounds all of these elements. The fourth electrical wire 148 is part of the equipment grounding circuit, and is internally electrically connected at one of its ends to the terminal of the assembly 108, which in turn is in good electrical conducting contact with the casing 18 through its flexible contact plate 120, and at its other end electrically connected to a portion of the electrically powered device that it is desired to be grounded. To mount the mechanism 152 to the casing 18, a plurality of mounting screws 156 extend from the exterior through appropriate openings in the mounting flange 158 of the mechanism and are anchored in threaded bosses 160 formed in the radial wall portion 40 of the casing 18 (see FIG. 3). A plurality of clearance openings 162 are formed in the axial side 142 of the body section 16 to accommodate the bosses 160 and the inner ends of the screws 156.

*Connector Body*

The construction and assembly of connector body 12 can best be understood by reference to FIGS. 4 and 8–11.

The connector body 12 comprises essentially a three-section body of electrical insulation material which houses a plurality of electrical elements and a two-part metallic casing. The three body sections are generally configured as diametral sections of a cylinder and comprise forward body section 164, a central body section 166 and a rearward body section 168, and the casing comprises a forward casing section 170, and a rearward casing section 172. The three body sections are arranged to house a plurality of electrical elements and be rigidly secured to each other as a unitary assembly, and in turn to be rigidly secured as an assembly to the rearward casing section 172; the forward casing section 170 is arranged to be thereafter rigidly, but detachably, secured to the rearward casing section 172 to complete the assembly of the connector body 12.

Figure 12:
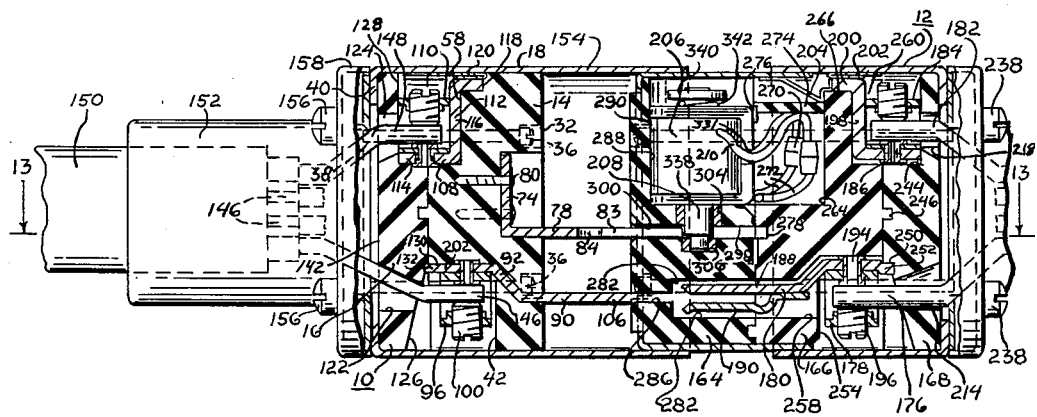
FIG. 12 is a longitudinal sectional view taken substantially vertically centrally through the connector cap and body, showing them in disconnected condition.
Figure 13:
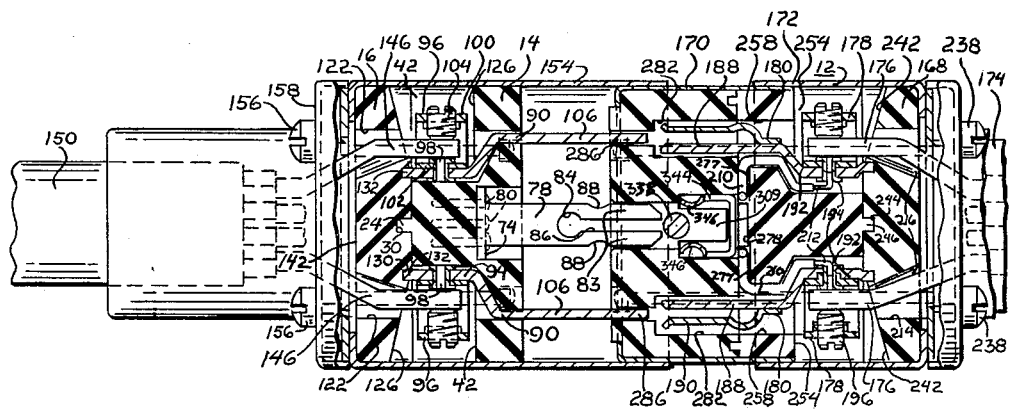
FIG. 13 is a sectional view taken substantially on line 13—13 of FIG. 12.

As can best be seen in FIGS. 12 and 13, a multi-wire, electrical cable 174 is arranged to enter the connector body centrally of the casing section 172 and to have three of its individual wires 176 directed to the terminal portions, in the form of terminal blocks 178, of female contact-terminal assemblies 180, and its fourth wire 182 directed to a terminal portion, in the form of terminal block 184, of grounding contact-terminal assembly 186. The assemblies 180 include female contact portions in the form of spring clips individually formed by contact blades 188 and contact springs 190. The contact blades 188 form part of elongated bent plates 192 that at one of their ends have rigidly secured thereto the referred-to terminal blocks 178, that are similar to terminals 96 of the assemblies 90 of the connector cap 10. The terminal blocks 178 are rigidly connected to the bent plates 192, as by eyelets 194, and include adjustable plugs 196 for clamping wires to the terminal blocks. In the case of the grounding contact-terminal assembly 186, in lieu of a bent plate that forms part of a female contact portion, it has a bent plate 198 that includes a bent leg 200 that rigidly supports two resilient grounding contact plates 202 and 204. When the connector body 12 is fully assembled, the contact plates 202 and 204 are in good electrical contact with the inner sides of casing sections 172 and 170, respectively, and function to ground these casing sections, as will become apparent subsequently.

The connector body 12 also includes electrically operated latching means for cooperating with the latching blades 78 of the connector cap 10 to automatically prevent coupling or uncoupling of the connector components when the supply of electrical current is operative on the connector body 12. In the illustrated embodiment, the latching means is in the form of a solenoid 206 having an armature in the form of a reciprocable plunger pin 208. As can best be seen in FIGS. 12 and 13, the solenoid 206 has a coil including a pair of lead wires 210 that are electrically connected to two of the terminal blocks 178. Each of the lead wires 210 may be conveniently formed in two sections, to facilitate assembly, that are connected by connectors 270, of known construction. The sections 272 of the lead wires may be electrically connected to the terminal blocks 178 as by having their ends received in eyelets 194 and soldered thereto.

The particular manner of fabricating and assembling the parts of the connector body 12 will now be set forth in detail. With particular reference to FIGS. 8–11, the detailed construction of each of these parts may be observed. The rearward body section 168, when viewed from its rear axial side 212, includes three circular openings 214 that extend axially completely through body section 168 and which have radially inwardly extending large entrances 216 formed at the side 212 to facilitate the insertion therethrough of the three electrical conductor wires 176, which are current-carrying wires. A fourth circular opening 218 is formed completely through the body section 168 through which the fourth electrical conductor wire 182, which is an equipment grounding wire, is inserted. A pair of axial bores 220 are also formed in and through the rear body section 168 and arranged to receive elongated screws 222 to secure all three body sections together, by extending through the bores 220, a pair of aligned axial bores 224 formed in the central body section 166 and by being anchored in threaded inserts 226 embedded in forward body section 164. Hence, screws 222 secure the body sections together as a unitary assembly. Rearward body section 168 also includes a plurality of axial bores 228 that are arranged to receive screws 230 that extend through axial bores 232 formed in the forward body section 164, through axial bores 234 formed in the central body section 166, through bores 228 formed in body section 168 and are anchored in threaded openings 320 in casing section 172. Rearward body section 168 also includes a plurality of bores 236 to provide clearance for threaded bosses 237 that receive the inner ends of screws 238 for mounting the connector body cable gripping mechanism which is similar to mechanism 152, but forms no specific part of this invention, and therefore, is not described in detail herein. It will be observed in FIG. 11 that adjacent pairs of bores 228 and 236 are formed at notches 237 formed in the axial side 212 of the body section 168, and that a pair of spaced axially extending grooves 326 are formed in the periphery of body section 168. The other axial side 240 of the rearward body section 168 has three notches 242 having inclined base walls circumferentially spaced at the periphery thereof and extending radially inwardly and intersecting with an arcuate portion of openings 214. A fourth large box-like notch 262 is formed in the rear body section 168 and opens to the axial side 240 and the periphery thereof and sourrounds opening 218. Two spaced circular positioning recesses 244 are formed in rearward body section 168 and open to the axial side 240 thereof, and they cooperate with a pair of spaced circular axial projections 246 formed on central body section 166 at axial side 248 thereof to properly align the body sections 166 and 168 for assembly. In the rearward body section 168 at the axial side 240 thereof there are also formed three small boxy recesses 250 which are disposed to receive projecting lugs 252 formed at the ends of bent plates 192 of assemblies 180.

The central body section 166 has three circumferentially spaced notches 254 formed therein which extend longitudinally partially therethrough, open through the periphery thereof, and open through axial side 248 thereof. Each notch 254 communicates with the axial side 256 of the central body section through axial slots 258, and assemblies 180 are adapted to be mounted individually in the central body section 166 by having their terminal blocks 178 disposed in notches 254 and by having female contact portions 188, 190 extend through slots 258 and project through and beyond the axial side 256. When the rearward and central body sections are assembled, notches 254 cooperate with notches 242 to form chambers for housing the terminal blocks 178 of assemblies 180. A fourth notch 260 is formed in the central body section 166, opens through the periphery thereof and through the axial side 248 thereof. The notch 260 extends partially axially into the central body section and is axially shallower than notches 254. When the rearward body section 168 and the central body section 166 are assembled, the notch 260 cooperates with the notch 262 formed in the rearward body section to provide a chamber for housing the grounding contact-terminal assembly 186. Approximately the rearward axial half of the central body section is the same diameter as that of the rearward body section; however, the forward half thereof is of slightly reduced diameter. The notch 260 in the central body section 166 communicates with a large cavity 264 formed therein and opening to the periphery thereof and the axial side 256 thereof through a deep axial groove 266 that is formed generally in the periphery of the rearward half of the central body section adjacent a shallow axial groove 268. Another shallow axial groove 268 is formed on the periphery of the rearward half but circumferentially spaced from the groove 268 adjacent the groove 266 (see FIG. 10). The grooves 268 are disposed to align with grooves 326 formed in the rear body section when these body sections are assembled. The cavity 264 is arranged to accommodate lead wires 210 including wire connectors 270 and wire sections 272. As previously mentioned, the ends of lead wire sections 272 are soldered or otherwise connected to the eyelets 194 of two of the terminal blocks 178 of the assembly 180. A separable insulating block 274 having a resilient flat overhanging wall 276 secured to it is constructed and arranged to be placed in the cavity 264 over the lead wires 210 and electrically isolate them from the casing and grounding contact plates 202 and 204 and retain them in cavity 264. Grounding contact plates 202 and 204 are secured to leg 200 of assembly 186 which is disposed in groove 266 of the central body section when the rear and central body sections are assembled. A portion of grounding plate 204 is arranged to be disposed in the cavity 264 on the radially outer side of the insulating block 274. The axial side 256 of the central body section has a raised face formation formed thereon that is arranged to mate with a complementary face formed on forward body section 164 when these body section are assembled. A generally centrally disposed elongated recess 278, and a pair of shallow recesses 277 are formed in the central body section and open to the axial side 256 thereof. The recesses 277 communicate with two of the slots 258 through lateral chambers 279 to provide clearance for the lead wires 210 to extend from within two notches 254, where they are secured to the terminal blocks 178 therein, into the cavity 264.

Forward body section 164 is the same diameter as the forward half of the central body section and includes an axial side 280 having a depressed face formation which is arranged to complement the raised face formation of the axial side 248 of the central body section, so that these body sections snugly mate when assembled. The forward body section also includes three axially extending deep boxy recesses 282 that extend toward, but short of, the front axial side 284 of the forward body section, and which communicate with elongated slots 286 that extend completely through the front axial side of the forward body section. Recesses 282 are arranged to align with slots 258 in the central body section and to accommodate portions of the female contact portions 188, 190. A rather large cavity 288 having an arcuate axially forward wall 290, flat parallel side walls 292, and a flat base wall 294 is formed in the forward body section and opens peripherally thereof and through the axial side 280 thereof. Cavity 288 is arranged to house solenoid 206 and its associated elements and to cooperate with cavity 264 in the central body section to form a very large chamber when the central and forward body sections are assembled. Therefore, the lead wires 210 are conveniently housed in this chamber and extend into slots 258 of the central body section through grooves 279 and recesses 277 as previously described.

Spaced radially from the base wall 294 of cavity 288 and extending from the axial side 280 of the forward body section toward, but short, of the forward wall portion 290 of cavity 288 is a U-shaped recess 296 that includes a flat wall 298 that is parallel to the base wall 294. Recess 296 communicates with the front axial side 284 through an elongated slot 300. Extending radially through the portion of the forward body section between walls 294 and 298 is a circular opening 302 in which a metal bushing 304 is rigidly mounted. Aligned with the bushing 304 and spaced therefrom is another metal bushing 306 which is mounted rigidly in the block-like portion 308 of the forward body section formed between the legs of the U-shaped recess 296 and open at the wall 309 thereof which is spaced from and parallel to the wall 298 (see FIG. 14). The bushing 306 is of lesser diameter than the bushing 304. The bushings 304 and 306 are arranged to slidably receive the solenoid plunger 208 for controlled reciprocation.

The solenoid plunger 208 is mounted to reciprocate radially in a predetermined manner to latch or unlatch latching blade 78 of the connector cap, as will be subsequently described in greater detail.

The casing section 170 for the connector body is generally annular and of less diameter than the casing section 172; casing section 170 includes a radially inwardly extending flange 312 at its front end, a radially inwardly deformed axial channel 314 in its side, a reduced diameter rear portion 316 that is dimensioned to snugly telescope in the front end of casing section 172 and a pair of bayonet slots 318. After the body sections 164, 166 and 168 have been assembled and secured to each other by utilizing the screws 222 which pass through aligned bores 220 and 224 and are anchored in inserts 236, the assembled body sections are rigidly secured as a unitary assembly in the rearward casing section 172 by the screws 230 which pass through the aligned bores 232, 234 and 236 of the body sections and are anchored in threaded openings 320 formed in annular radial wall portion 322 of the casing section 172 (see FIG. 8). The casing section 172 includes a pair of circumferentially spaced radially inwardly extending pins 324 which are arranged to slide over axially extending peripheral grooves 326 formed in body section 168 and aligned similar grooves 268 formed in the central body section 166, and which cooperate with the bayonet slots 318 formed at the rear end of the forward casing section 170, when the latter is slid over the forward body section 164, and juxtaposed to the rearward casing section 172 to permit a bayonet type joint connection between the two casing sections by utilization of the bayonet slots 318 and pins 324 in a known manner. When the casing section 170 is slid over the forward body section 164, its axial channel 314 is accommodated in an axial groove 328 formed in the periphery of body section 164 and an axial groove 329 formed in the periphery of the front half of body section 166.

*Electrical Wiring*

The foregoing constitutes a detailed description of the construction of the connector cap 10 and the connector body 12. By reference to FIG. 18, one representative manner of electrically wiring the illustrated connector components in schematically illustrated. Reference numerals which have been heretofore used to designate described structural elements are utilized in FIG. 18 to designate the corresponding elements schematically illustrated. It is believed that it is clear from FIG. 18 that the electrical elements of the connector body 12 are wired to a source of electrical power to both provide a power supply and for proper grounding. Two of the wires 176 comprise two main power lines and are at their source connected to a source of electrical potential conventionally indicated by + and −. As previously described, they are electrically connected to terminal blocks 178 of assemblies 180. The solenoid 206 is electrically connected across these two main lines by lead wires 210 to draw full line current and has an inherent resistance which enables it to withstand the current operating across the two main lines. The wire 176 that is illustrated between the two main line wires 176 is the grounded-neutral wire, and it is connected to the terminal block 178 of the assembly 180 which is illustrated centrally in FIG. 18. Whenever the main lines 176 are electrically connected to a source of electrical current, the usual solenoid coil in the solenoid 206 is energized and functions in a known manner to cause the solenoid plunger 208 to move to its projected position. When the main lines 176 are disconnected from the source of electrical power, the solenoid coil is de-energized and the solenoid plunger moves to its retracted position. Circuit breaking means, such as simultaneously manually operable switches S, is provided to permit the source of electrical power to be selectively rendered operative or inoperative on the assemblies 180 of the connector body. The fourth wire 182 of the connector body is at one end connected to a source of ground and at its other end connected to the terminal block 184 of the assembly 186. The grounding contact plates 202 and 204 are in good electrical contact with the leg 200 of the assembly 186 and with the inner sides of the casing sections 172 and 170, respectively, to thereby provide a grounding path for these casing sections through the contact plates 202 and 204, through the assembly 186 and through the wire 182 to ground.

Electrical elements of the connector cap 10 include the three male contact blades 106 of the assemblies 90, which also includes terminal blocks 96 to which the three wires 146 are individually electrically connected. The other ends of the wires 146 may be electrically connected to the device being electrically powered in any known desired manner. The connector cap 10 also includes the fourth wire 148 which is electrically connected to the terminal block 110 of the assembly 108. The grounding contact plate 120 is in good electrical contact with both the leg 118 of the assembly 108 and the inner side of the casing 18. The other end of the fourth wire 148 is connected to a portion of the device being powered that is to be grounded. The grounding path in the connector cap is from the portion of the electrically powered device being grounded, through the wire 148 to the terminal block 110, through the bent plate 112, through the grounding contact plate 120 and to the casing 18. When the connector cap and body are connected, the male contact blades 106 are received in the female contacts 188, 190 of the assemblies 180, to thereby connect the two main lines and the grounded neutral line. Connection of connector components also causes tight physical engagement between the connector body casing section 170 and the connector cap casing 18 which electrically connects the grounding circuitry of both the connector components. In order to enhance this contact, flexible strip 138 that is carried by casing 18 is physically arranged to be biased against the casing section 170. The foregoing represents a general description of one example of the mode of wiring of the connector components, and it will be observed that it involves the utilization of four-wire cable. It will be realized by those skilled in the art that the invention is not limited to the utilization of four-wire cables.

*Operation of Locking Means*

With particular reference to FIGS. 14–17, the unique operation of the locking means which produces the principal safety feature of the connector and a more detailed description of its construction will now be set forth. The solenoid 206 includes a laminated C-shaped metallic frame 330 that rigidly carries a solenoid coil 332 that is covered with a layer of wrapped insulation material 334 and mounted on a metallic eyelet 336 (see FIG. 2). The solenoid frame includes a pair of lateral notches 331 to permit passage of lead wires 310 to facilitate assembly (see FIGS. 8 and 12). Within the eyelet 336 and mounted for reciprocable movement therein is the solenoid plunger 208. The greater axial extent of the solenoid plunger comprises a main cylindrical portion 338 that at one end has the reduced portion 310 of lesser diameter than the main portion 338, and at its other end rigidly carries a cup-shaped cap 340. When the solenoid plunger is mounted in the solenoid, a light coil return spring 342 is mounted on the main portion 338 thereof under the cap 340 prior to inserting the solenoid plunger, reduced end first, through the eyelet 336. When the solenoid plunger 208 is operatively mounted in the solenoid 206 and a source of electrical power is not operative on the wires 176 of the connector body, i.e. the circuit breaker S,S,S is opened, the solenoid coil 332 is de-energized and the solenoid plunger in biased to its retracted position (upper position in FIGS. 1, 2, 12, 14 and 15), and the main portion 338 of the solenoid plunger is completely disposed upwardly of the space generally formed within the slot 300 between the walls 298 and 309, as can be best seen in FIG. 15, which for convenience will hereinafter be referred to as the "latching space." When the source of electrical power is operative on the connector body, i.e. the circuit breaker S,S,S is closed, the solenoid coil is energized and the solenoid plunger moves downwardly to its projecting position. The return spring is under slight stress when the solenoid plunger is in its retracted position (see FIG. 15), and under considerable stress when the solenoid plunger is in projecting position (see FIGS. 1, 2, 12 and 14). As can best be seen in FIG. 14, when the solenoid coil is energized and the solenoid plunger is in projecting position, part of the main portion 338 of the solenoid plunger is disposed in the latching space. When the solenoid coil is de-energized and the solenoid plunger is in the retracted, FIGS. 15 and 17 condition, only the reduced end 310 of the solenoid plunger is disposed in the latching space.

The cooperative latching operation of solenoid plunger 208 in the connector body 12 and the latching blade 78 of the connector cap 10 produces the desired locking operation for the connector components. When the main portion 338 of the solenoid plunger is disposed in the latching space, as a result of energization of the solenoid coil and movement of the solenoid plunger to its projecting position, neither connection nor disconnection of the connector components can occur. This results from the fact that the diameter of the main portion 338 of the solenoid plunger is greater than the width of opening 86 in the latching blade 78, i.e. the distance between the fingers 83 of the latching blade 78, and therefore, on attempted connection or disconnection of the connector components, during which, among other things, the latching blade 78 is inserted into and through the slot 300 into the latching space, or removed therefrom, the fingers 83 may not pass around main portion 338, and therefore, the latter interferes with movement of the latching blade in the latching space in either the connecting or disconnecting directions. However, when the solenoid coil is de-energized and the solenoid plunger is in its retracted position, only the solenoid plunger reduced portion 310 is disposed in the latching space, for the main portion 338 of the solenoid plunger is retracted within the eyelet 336. Connection or disconnection may be effected when the solenoid is de-energized, because the diameter of the reduced portion 310 is less than the width of opening 86 in the latching blade 78, hence, does not obstruct movement of the latching blade in the latching space.

To be more specific, if the connector components are already connected and the solenoid is energized, the connector components cannot be disconnected, because part of the main portion 338 of the solenoid plunger will be disposed in the opening 84 of the latching blade 78, and since this portion of the solenoid plunger is of a diameter which is greater than the distance between the latching blade fingers 83, relative movement of the latching blade relative to the solenoid plunger is prevented and the latching blade cannot be withdrawn from the slot 300 (see FIG. 16). On the other hand, if the connector components are disconnected and the solenoid is energized, connection cannot be effected, because insertion of the latching blade 78 is prevented by the obstruction of the main portion 338 of the solenoid plunger with the latching blade fingers 83. This relationship is indicated in FIG. 16, which shows the main portion 338 in dotted lines in the position which it occupies relative to the latching blade when the connector components are disconnected, the solenoid is energized, and connection of the connector components is attempted.

FIGS. 1, 2, 14 and 16 illustrate the relative positions of the latching blade and the solenoid plunger when the connector components are connected and the solenoid is energized as a result of a source of electrical power being operative on the connector body. In this condition, disconnection is precluded because of the latching of the latching blade by the solenoid plunger. The relative positions of the latching blade and solenoid plunger when the connector components are disconnected and the solenoid is energized as a result of a source of electrical power being operative on the connector body are shown in FIGS. 12 and 13, where it will be observed that connection of the connector components is prevented by the physical interference of the main portion 338 of the solenoid plunger with the free ends of the latching blade fingers 83, which prevents further insertion of the latching blade into the slot 300. It should be observed in FIGS. 12 and 13 that at this time the current-carrying contacts of both connector components are out of engagement.

The operation of the locking means involves an advantageous aspect which should be noted. By utilizing the reduced end 310 on the solenoid plunger and structurally associating it with the uniquely configured latching blade 78, the length of the "stroke" of the solenoid plunger, i.e. the distance between its retracted unlatching position and its projecting latching position, is shortened. This permits the utilization of a solenoid that operates with a shorter stroke than would otherwise be required.

Figure 2:
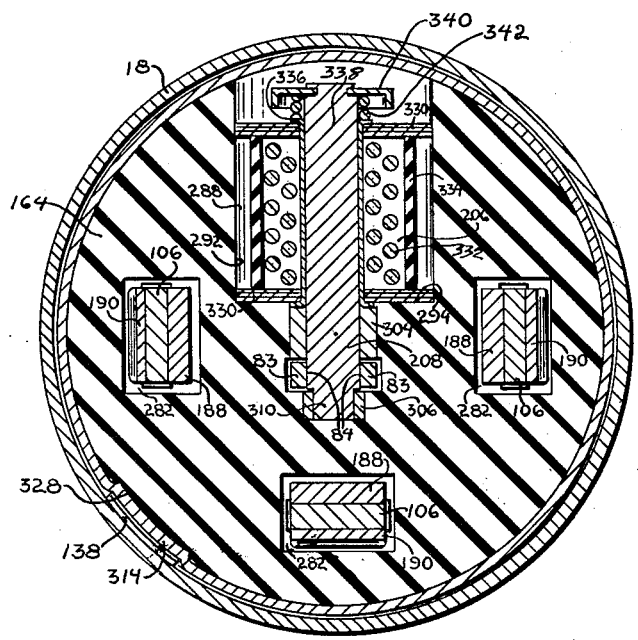
FIG. 2 is an enlarged sectional view taken substantially on line 2—2 of FIG. 1.

The prevention of connection or disconnection of the connector components when a source of electrical power is operative on the connector body is desirable and is the principal purpose of the invention, for it produces the desirable safety feature discussed in detail in the introduction of this specification. In view of the foregoing it will be apparent that this objective has been achieved for it will be apparent that connection or disconnection of the connector components may be effected only when the solenoid is de-energized and the solenoid plunger is in its retracted position, illustrated in FIGS. 15 and 17. Therefore, in order to either connect or disconnect the connector components the source of electrical power must be rendered inoperative on the connector body as by opening the circuit breaker S,S,S. Therefore, dangerous arcing cannot occur on connection or disconnection of the connector components, because the connector body must be electrically disconnected from the source of power before the solenoid plunger will be retracted to unlatching position to permit movement of the latching blade into or out of the latching space. It will be understood by those skilled in this art that the connector components are otherwise connected and disconnected in a conventional manner by aligning the male contact blades 106 with the slots 286 formed in the connector body, it being noted that this also causes alignment of the channel 314 of the connector body casing section 170 with the ground contact strip 138 mounted on the inside of the connector cap casing 18, in addition to aligning the latching blade 78 with the slot 300 of the connector body. On the assumption that the source of electrical power is inoperative on the connector body, full insertion of the male contact blades 106 into the female contacts 188, 190, and of the latching blade 78 into the latching space in the connector body may be effected, and when this is done these parts are disposed as illustrated in FIGS. 1 and 2, wherein it will be observed that the male contact blades 106 are fully disposed in the female contacts 188, 190, to thereby complete the electrical power line connections. It should also be realized that at this time good physical contact between the connector cap casing 18 and the connector body casing section 170 is effected by the ground contact strip 138 which is received in the groove 314 of the connector body casing section 170. The latter effects connection of the grounding circuit from the equipment through the connector cap, through the connector body and to the source of ground as previously described. After connection of the connector components, the electrical power may be rendered operative on the cable by closing circuit breaker S,S,S. It will be particularly observed in FIG. 1 that when the connector components are connected, the free ends of the latching blade fingers 83 extend into the recess 278 formed in the central connector body section 166. To correctly position the latching blade 78 relative to the solenoid plunger 208, in order that the latter may enter the opening 84 in the former to latch it on energization of the solenoid by closing the circuit breaker S,S,S, a U-shaped saddle spring 344 is mounted in the U-shaped recess 296, and has laterally extending tabs 346 on its arcuately bent free ends 348 that project into the general vicinity of the latching space in position to be contacted and biased apart by the free ends of latching blade fingers 83 and to seat in the lateral arcuate cut-out portions 88 of the latching blade and thereby retain the latter in proper position for subsequent entry of the solenoid plunger into the opening 84 of the latching blade on subsequent energization of the solenoid as a result of the subsequent closing of the circuit breaker S,S,S (see FIGS. 9 and 13).

In view of the foregoing it should be apparent that applicant has provided a significantly improved electrical connector which automatically operates in a safe manner to prevent arcing on connection or disconnection and which may be utilized in heavy duty electrical applications wherein safety is a serious problem.

As will be evident from the foregoing description, certain aspects of my invention are not limited to the particular details of construction of the examples illustrated, and I contemplate that various and other modifications and applications will occur to those skilled in the art. It is, therefore, my intention that the appended claims shall cover such modifications and applications as do not depart from the true spirit and scope of my invention.

What I claim as new and desire to secure by Letters Patent of the United States is:

1. An electrical cable connector comprising: a longitudinally extending connector cap; and a longitudinally extending connector body; said connector cap including a body of electrical insulating material having a front transverse face; a plurality of electrical contact-terminal assemblies mounted in said connector cap body, each including a contact portion and a terminal portion, the terminal portions being arranged to receive and electrically connect individual conductor wires of a multi-wire cable that is adapted to be connected to a device to be powered; an elongated latching blade having an opening rigidly centrally mounted on said connector cap body and projecting longitudinally away from its face; said connector body including a body of electrical insulating material including a front transverse face; a plurality of electrical contact-terminal assemblies mounted in the insulated body of said connector body, each including a contact portion and a terminal portion, the terminal portions being arranged to receive and electrically connect individual conductor wires of a multi-wire cable that is adapted to be connected to a source of electrical power; the contact portions of the contact-terminal assemblies of the connector cap being accessible from the face of the connector cap body and arranged to engage the contact portions of the contact-terminal assemblies of the connector body which are accessible from the face of the insulated body thereof on relative closing longitudinal movement of said connector cap and said connector body; an elongated longitudinally extending latching space formed transversely centrally in the insulated body of said connector body, accessible through the center of the face thereof and aligned with said latching blade; a latching pin mounted in the insulated body of said connector body for limited controlled movement in a direction transverse to the longitudinal direction; said latching pin normally being disposed in a retracted position electrically operated solenoid means for moving said latching pin to a projecting position when energized wholly mounted within the insulated body; said electrically operated means being electrically connected to the terminal portions of the contact-terminal assemblies mounted in the insulated body of said connector body whereby it is energized whenever the source of electrical power energizes the last mentioned terminal portions; said latching pin having means which extends into said latching space whenever said electrically operated means is energized and is positioned to engage means on said latching blade to prevent longitudinal closing movement of said connector cap and body to effect engagement of the contact portions if the connector is disconnected whereby the connector cannot be connected when the connector is disconnected and the source of electrical power energizes the contact-terminal assemblies of said connector body, and to be disposed in said opening to prevent longitudinal separating movement of said connector cap and body to effect disengagement of the contact portions if the connector is connected whereby the connector cannot be disconnected when the connector is connected and the source of electrical power energizes the contact-terminal assemblies of said connector body.

2. An electrical connector as defined in claim 1 wherein said latching blade further includes an elongated slot which extends from said opening to the free end thereof; said latching pin comprises a plunger-like elongated member that is mounted for longitudinal movement in a direction transverse to that of the latching blade and includes a main portion of a cross-section to fit within said opening and an end portion of reduced cross-section relative thereto; said slot having a transverse width that is less than the smallest transverse dimension of said main portion, but more than the largest transverse dimension of said reduced end portion; and said latching pin is mounted so that when it is in retracted position only its reduced end portion is operatively disposed in said latching space and therefore connection or disconnection of said connector is permitted for said latching blade is free to move longitudinally in said latching space because said reduced end portion does not interfere with such movement, it being of a cross-section to pass freely in said slot to permit movement of said latching blade relative thereto, and when said latching pin is in its projecting position only said main portion is operatively disposed in said latching space and therefore neither connection nor disconnection of said connector is permitted for said connector cap latching member is not free to move longitudinally in said latching space to effect connection or disconnection because said main portion interferes with such movement, it being of a cross-section which is incapable of passing through said slot to permit such movement of said latching blade, because if said main portion is disposed in said opening, as it is when said connector is connected and said latching blade is in projected position, it prevents withdrawal of said latching blade out of said latching space, and if said latching pin is not in said opening, as when the connector is disconnected, and it is in projecting position it prevents full insertion of said latching blade into said latching space.

3. An electrical connector as defined in claim 1 wherein resilient means is mounted in said connector body and arranged to engage said latching blade when the latter is fully inserted into said latching space to position it properly relative to said latching pin so as to align the latter with said opening and permit its disposition in said opening.

4. An electrical connector as defined in claim 1 wherein each of the insulated bodies of said connector cap and body comprises a plurality of readily detachable body sections which removably mount their associated contact-terminal assemblies.

5. An electrical connector as defined in claim 4 wherein the body sections of said connector cap and connector body each are housed in a casing made of electrical conducting material; said casings are in good electrical conducting contact when the connector is connected; the casing of said connector body is in electrical contact with and grounded through a grounding wire of the cable that is connected to said connector body; and the casing of said connector cap is in electrical contact with a grounding wire of the cable that is connected to the connector cap, the last mentioned grounding wire being adapted to be electrically connected to a portion of the device to be powered or other element which it is desired to ground; whereby on connection of the connector said casings and said last mentioned portion or element are grounded.

6. An electrical connector as defined in claim 1 wherein a pair of rigid bushings is disposed in the insulated body of said connector body, one adjacent each side of the latching space formed therein and having aligned openings which are arranged to receive said latching pin and do receive and support said latching pin when it is in its projecting position.

References Cited in the file of this patent

UNITED STATES PATENTS

| | | |
|---|---|---|
| 776,177 | George | Nov. 29, 1904 |
| 941,782 | Hubbard | Nov. 30, 1909 |
| 1,198,509 | Anderson | Sept. 19, 1916 |
| 2,291,793 | Chandler | Aug. 4, 1942 |
| 2,410,618 | Zelov | Nov. 5, 1946 |
| 2,497,697 | Smith | Feb. 14, 1950 |
| 2,874,336 | Wannemacker | Feb. 17, 1959 |

FOREIGN PATENTS

| | | |
|---|---|---|
| 443,466 | Great Britain | Feb. 28, 1936 |
| 363,487 | Germany | Nov. 10, 1922 |
| 482,291 | Germany | Sept. 11, 1929 |